UNITED STATES PATENT OFFICE.

HEINRICH MIELCK, OF NEW YORK, N. Y., ASSIGNOR TO MIELCK'S STONE AND TERRA COTTA COMPANY, A CORPORATION OF NEW YORK.

PROCESS OF PRODUCING ARTIFICIAL STONE.

SPECIFICATION forming part of Letters Patent No. 711,329, dated October 14, 1902.

Application filed March 6, 1901. Renewed May 26, 1902. Serial No. 108,995. (No specimens.)

*To all whom it may concern:*

Be it known that I, HEINRICH MIELCK, a citizen of the Republic of Brazil, residing in New York, borough of Manhattan, in the State of New York, have invented certain new and useful Improvements in Processes of Producing Artificial Stone, of which the following is a specification.

In the manufacture of artificial stone from burnt carbonate of magnesia and magnesium chlorid according to the process invented by Stanislas Sorel and for which United States Letters Patent No. 53,092 was granted to him on March 6, 1866, a great many processes were invented and patented in which the same reaction was employed, but which were not attended with any remarkable practical results for the reason that the mineral magnesite being found only in a few parts of the world was too expensive for general application, as too great a quantity of the burnt magnesia was required. Consequently the artificial stone could not be supplied at a price low enough to compete with natural stone except when made up in the form of artificial marble for interior decorative purposes. A feature of this process was that it was carried out in making the ingredients so that an easily-flowing liquid was obtained, so that a quick reaction resulted.

The object of my invention is to so improve the process of Sorel as to diminish the considerable quantity of magnesia employed and permit the employment of larger proportions of sand or other cheaper filling substances; and the invention consists in the process of making artificial stone which comprises the steps of intimately mixing sand, burnt magnesia, and a concentrated solution of magnesium chlorid in substantially the proportions specified, tamping the mass into shape, confining the thus compacted mass at all sides during the resulting slow reaction, whereby uniform pressure is exerted on the same, and continuing said confinement and pressure during the subsequent setting and cooling of the mass; and the invention consists, further, of a composition for making artificial stone composed of four parts of sand, one part of burnt magnesia, and one part of a concentrated solution of magnesium chlorid of 40° to 45° Baumé.

In carrying out my improved process one part of burnt carbonate of magnesia or caustic magnesia, one part of magnesium chlorid, and four parts of sand are employed. The proportions given are by weight. The sand is first mixed intimately with the burnt magnesia, after which a concentrated solution of magnesium chlorid in water of 40° to 45° Baumé is added. This moist almost dry mass is then pressed or tamped into wood, iron, or other molds of the required shape, which are closed before the chemical reaction between the magnesia and the magnesium chlorid takes place. The reaction proceeds slowly and under pressure, owing to the small quantity of water employed, so that the process of heating and shaping of the mass is retarded and very slowly accomplished. The retardation of the reaction permits it to take place in the molds without injury to the same, the cooling off being likewise accomplished in the molds, so that as a result a firm and hard artificial stone is obtained. If a larger quantity of water were used and a liquid or pasty mass be formed, as in similar processes heretofore employed, it would not be possible to let the reaction proceed under pressure in the molds; but by the small quantity of moisture present and the slow progress of the reaction this can be accomplished, and therefore a hard and compact stone be formed. In the slow progress of the reaction, due to the small quantity of moisture while the mass is held under pressure in the mold, consists the essential feature of my invention, as thereby a comparatively large quantity of sand can be employed and firmly compacted with the magnesia, during the reaction of which a comparatively small quantity only is used.

An artificial stone in imitation of marble can be obtained by the same process, only with the difference that in place of the sand marble waste or pulverized marble may be used, to which the necessary coloring and veining is imparted by the addition of suitable dyestuffs. This imitation marble is pressed or tamped in a face layer onto the face of the block in the manner before described before setting takes place. Both mixtures unite at their contacting faces during the reaction, so that an artificial stone is obtained with a face layer of marble.

Different colors can be imparted to my improved artificial stone by the addition of suitable pigments and dyestuffs, the pigments being preferable when a uniform color is to be imparted through the entire body of stone, while dyestuffs are better adapted for the face layer in imitation of marble and the veinings of the same.

The advantages of my improved process of producing artificial stone are, first, that a comparatively small quantity of burnt magnesite is required. This is an essential point, as this substance is only found in comparatively small quantities in the United States, the best quality being imported from Greece; second, that by the slow or retarded reaction and the pressure used during the formation of the artificial stone the quick expansion of the mass during its reaction is avoided, so that no injury to the molds is produced; third, that by the setting and cooling of the mass in the mold it forms a very strong and durable stone in imitation of sand or other stone, the faces of which are perfectly smooth and require no polishing or other treatment.

Having thus described my invention, I claim as new and desire to secure by Letters Patent—

1. The herein-described process of making artificial stone, which consists in intimately mixing sand, burnt magnesia and a concentrated solution of magnesium chlorid in substantially the proportions specified, tamping the mass into shape, and confining the thus compacted mass at all sides during the resulting slow reaction, substantially as set forth.

2. The herein-described process of making artificial stone, which consists in intimately mixing sand, burnt magnesia and a concentrated solution of magnesium chlorid in substantially the proportions specified, tamping the mass into shape, confining the thus compacted mass at all sides during the resulting slow reaction, whereby uniform pressure is exerted on the same, and continuing said confinement and pressure during the subsequent setting and cooling of the mass, substantially as set forth.

In testimony that I claim the foregoing as my invention I have signed my name in presence of two subscribing witnesses.

HEINRICH MIELCK.

Witnesses:
PAUL GOEPEL,
GEORGE GEIBEL.